(12) United States Patent
Devireddy et al.

(10) Patent No.: US 9,130,775 B2
(45) Date of Patent: Sep. 8, 2015

(54) SUPPORT FOR VIRTUAL EXTENSIBLE LOCAL AREA NETWORK SEGMENTS ACROSS MULTIPLE DATA CENTER SITES

(71) Applicant: CISCO TECHNOLOGY, INC., San Jose, CA (US)

(72) Inventors: Dileep K. Devireddy, San Jose, CA (US); Shyam Kapadia, Santa Clara, CA (US); Yibin Yang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 121 days.

(21) Appl. No.: 13/939,079

(22) Filed: Jul. 10, 2013

(65) Prior Publication Data

US 2015/0016300 A1    Jan. 15, 2015

(51) Int. Cl.
*H04L 12/46* (2006.01)
*H04L 12/24* (2006.01)
*H04L 12/56* (2006.01)

(52) U.S. Cl.
CPC ........ *H04L 12/4641* (2013.01); *H04L 41/0893* (2013.01); *H04L 45/741* (2013.01)

(58) Field of Classification Search
None
See application file for complete search history.

(56) References Cited

U.S. PATENT DOCUMENTS

| | | |
|---|---|---|
| 2010/0040070 A1 | 2/2010 | Suh et al. |
| 2013/0058346 A1 | 3/2013 | Sridharan et al. |
| 2013/0124750 A1 | 5/2013 | Anumala et al. |
| 2013/0142201 A1 | 6/2013 | Kim et al. |
| 2013/0266019 A1* | 10/2013 | Qu et al. ................. 370/395.53 |
| 2013/0318219 A1* | 11/2013 | Kancherla ..................... 709/222 |
| 2013/0322453 A1* | 12/2013 | Allan ........................ 370/395.53 |
| 2014/0050223 A1* | 2/2014 | Foo et al. ....................... 370/400 |
| 2014/0092907 A1* | 4/2014 | Sridhar et al. ................ 370/392 |
| 2014/0096183 A1* | 4/2014 | Jain et al. .......................... 726/1 |
| 2014/0112137 A1* | 4/2014 | Schlansker et al. ........... 370/235 |
| 2014/0169215 A1* | 6/2014 | Rajendran et al. ............ 370/254 |
| 2014/0192804 A1* | 7/2014 | Ghanwani et al. ............ 370/390 |
| 2014/0201733 A1* | 7/2014 | Benny et al. ...................... 718/1 |
| 2014/0269705 A1* | 9/2014 | DeCusatis et al. ............ 370/390 |

FOREIGN PATENT DOCUMENTS

WO    WO2015/006135    1/2015

OTHER PUBLICATIONS

Mahalingam, et al., "VXLAN: A Framework for Overlaying Virtualized Layer 2 Networks over Layer 3 Networks," Network Working Group, Internet Draft, Aug. 22, 2012, 21 pages.
PCT Nov. 4, 2014 International Search Report from International Application Serial No. PCT/US2014/045271.

* cited by examiner

*Primary Examiner* — Benjamin Lamont
(74) *Attorney, Agent, or Firm* — Patent Capital Group (57) ABSTRACT

A method is provided in one example embodiment and includes establishing a virtual trunk link between a first network element and a second network element. The first and second network elements are located at a first site and the first site and a second site comprise at least a portion of an overlay network. The method further includes receiving data traffic at the first network element, which data traffic is associated with a segment of the overlay network, and mapping a first network identifier allocated to the overlay network segment at the first network element to a virtual trunk link and a VLAN ID. The method additionally includes forwarding the data traffic from the first network element to the second network element via the virtual trunk link with the VLAN ID.

17 Claims, 6 Drawing Sheets

SUPPORT FOR VIRTUAL EXTENSIBLE LOCAL AREA NETWORK SEGMENTS ACROSS MULTIPLE DATA CENTER SITES

TECHNICAL FIELD

This disclosure relates in general to the field of computer networking and, more particularly, to techniques for extending Virtual eXtensible Local Area Network ("VXLAN") segments across multiple data center sites.

BACKGROUND

Overlay networks in general, and Internet protocol ("IP") overlay networks in particular, are gaining popularity for providing virtual machine ("VM") mobility over L3 networks. Virtual eXtensible Local Area Network ("VXLAN") is a technique for providing an L2 overlay on an L3 network. In particular, VXLAN is used to address the need for overlay networks within virtualized data centers accommodating multiple tenants. In such overlay networks, native frames are encapsulated with an outer IP overlay encapsulation, as along with a VXLAN header, and UDP header. In VXLAN, each overlay is referred to as a VXLAN segment. VMs within the same VXLAN segment are within the same layer 2 domain. Each VXLAN segment is scoped through a 24-bit segment ID, referred to as a VXLAN Network Identifier ("VNID"), which allows up to 16M VXLAN segments to coexist within a single administrative domain. The VNID scopes the inner MAC frame originated by the individual VM; therefore, overlapping MAC addresses may exist across segments without resulting in traffic cross-over. The VNID is included in an outer VXLAN header envelope in which the inner MAC frame originated by the VM is encapsulated. The term "VXLAN segment" herein may be used interchangeably with the term "VXLAN overlay network."

A VXLAN tunnel endpoint ("VTEP") is a hardware or software component that performs VXLAN encapsulation and decapsulation. The IP address used by a VTEP as the source address for VXLAN encapsulation is referred to as the VTEP address. The VTEP address, along with the inner source MAC addresses, may be learned by remote VTEPs. Multidestination frames in VXLAN may be carried in IP multicast packets, which use group addresses as destination IP addresses, or carried in IP unicast packets, which are replicated at the headend. To facilitate communication between VXLAN and non-VXLAN environments, an entity referred to as a VXLAN gateway is typically employed. For example, a VXLAN gateway may be used to connect a VXLAN overlay network with a VLAN network. Additional details are provided in "VXLAN: A Framework for Overlaying Virtualized Layer 2 Networks over Layer 3 Networks" (draft-mahalingam-dutt-dcops-vxlan-02), which is hereby incorporated by reference in its entirety.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes establishing a virtual trunk link between a first network element and a second network element. The first and second network elements are located at a first site and the first site and a second site comprise at least a portion of an overlay network. The method further includes receiving data traffic at the first network element, which data traffic is associated with a segment of the overlay network, and mapping a first network identifier allocated to the overlay network segment at the first network element to a virtual trunk link and a VLAN ID. The method additionally includes forwarding the data traffic from the first network element to the second network element via the virtual trunk link with the VLAN ID.

Example Embodiments

Most of large service providers and enterprises have data centers spread across multiple sites. The data center workload placement is largely driven by how an application is used. Generally, a tenant being serviced by a cloud provider will have an "elastic" demand, which may necessitate allocating for the tenant resources that are distributed across multiple sites. Many customers look at the network support for this deployment model. One requirement for networking is the ability to stretch a VXLAN segment across multiple sites, which will reduce the operational complexity of managing the solution. When a VXLAN segment spans across multiple sites, it is expected that the VXLAN segment may be assigned different VNIDs in different sites. This is due to the fact that each site may be independently managed and hence the allocation of the VNIDs from the 24-bit space is unlikely the same. While it may be argued that 16 million is a large enough space, the issue is coordination of the allocation of VNIDs across different administrative entities so that all entities use the same VNID while identifying a VXLAN segment. Certainly, for multi-site scenarios, this coordination may not be feasible unless the sites fall under the same managed administrative domain. It will be assumed for the sake of example and simplicity herein that VNID allocations are different among multiple sites, with the understanding that the ideas presented herein are similarly applicable if that is not the case and VNID allocations are the same.

Figure 1:
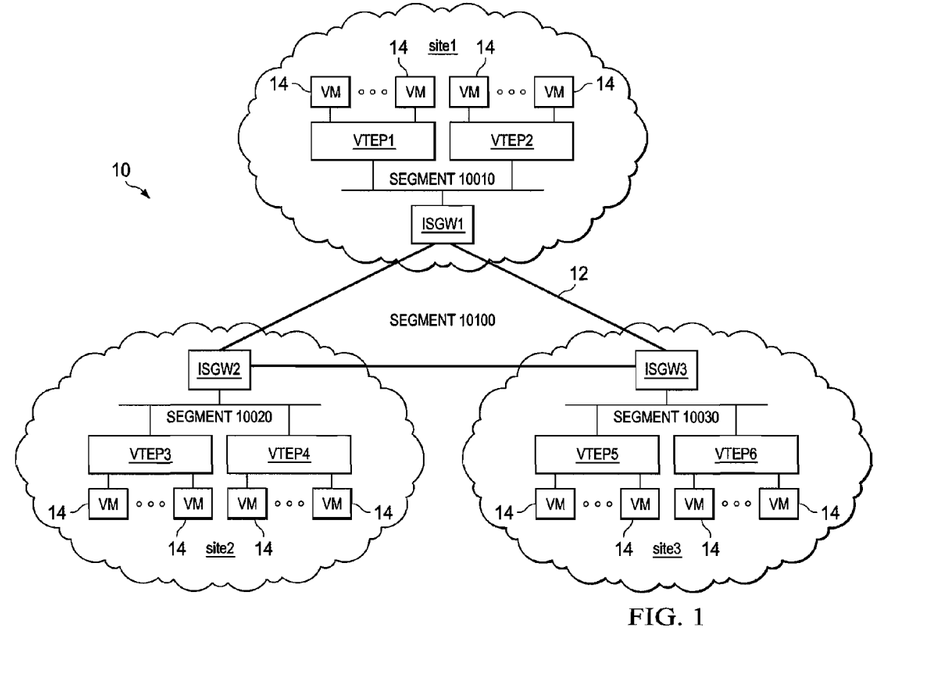
FIG. 1 is a simplified block diagram of illustrating deployment of a VXLAN across multiple data center sites in accordance with one embodiment.

Referring now to FIG. 1, FIG. 1 depicts a deployment of VXLAN across multiple sites, designated by a reference numeral 10. As shown in FIG. 1, the multi-site VXLAN deployment 10 comprises three data center sites, including site1, site2 and site3. Each of the data center sites includes a variant of VXLAN gateway referred to as inter-site gateway (ISGW) and respectively designated ISGW1, ISGW2, and ISGW3. ISGWs ISGW1, ISGW2, and ISGW3 are used to interconnect sites site1, site2 and site3, via gateway-to-gateway connections, designated in FIG. 1 by a reference numeral 12, as will be described in greater detail below. For example, as illustrated in FIG. 1, gateway element ISGW1 is deployed in site site1 for connecting site site1 to site site2 and site site3. Similarly, gateway element ISGW2 is deployed in site site2 for connecting site site 2 to site site1 and site site3 and gateway ISGW3 is deployed in site3 for connecting site3 to site1 and site2. Each ISGW provides connectivity within the respective site to one or more VTEPs deployed in the site. For example, as illustrated in FIG. 1, gateway element ISGW1 is connected to two VTEPs deployed at site site1, designated VTEP1 and VTEP2, ISGW2 is connected to two VTEPs deployed at site site2, designated VTEP3 and VTEP4, and ISGW3 is connected to two VTEPs deployed at site site3, designated VTEP5 and VTEP6. Each of the VTEPs VTEP1-VTEP6 is responsible for encapsulating/decapsulating packets originating from/destined for one or more VMs, represented in FIG. 1 by VMs 14, associated therewith. A VXLAN segment belonging to a tenant, referred to herein for the sake of example as "tenant A," spans across the three sites site1, site2, and site3.

In accordance with features of one embodiment, tenant A is allocated segment ID (or VNID) 10010 in site site1, segment ID 10020 in site site2, and segment ID 10030 in site site3. These segment IDs are site-local values whose scope is valid only within the domain of the respective site; they are used for intra-site communications. In addition, the tenant A segment is also allocated a segment ID 10100 among the gateway-to-gateway connections 12. As a result, in accordance with features of embodiments described herein, for intersite communication for tenant A segment traffic, the respective site-specific ISGW devices ISGW1, ISGW2, and ISGW3 need to perform the translation from the site-local segment value to the across site segment value. It is worthwhile to note although the gateway-to-gateway connections 12 are represented by links, they represent "reachability" rather than necessarily physical wires.

To extend VXLAN segments across multiple sites, several issues should be addressed. For example, a determination should be made as to how to map different segment IDs across multiple sites when VXLAN packets are sent from one site to another. Additionally, making all VTEPs visible everywhere in a large multi-site environment creates a scalability issue that should be addressed. Similarly, making VTEPs visible across sites creates a stability issue when VMs move within a site that should be addressed. Still further, multicast over site-to-site links is rarely possible, and it is inefficient to use head-end replication across sites (in which a copy is sent over site-to-site links for each VTEP in other sites). Moreover, private IP addresses may be used for VTEPs within a given site, which may not be routable from other sites. Finally, though control protocols such as Border Gateway Protocol ("BGP") may run within a site, customers may refuse to run such control processes between sites; consequently, segment pruning across multiple sites may need to be handled using a data path, rather than a control protocol, approach.

Figure 2:
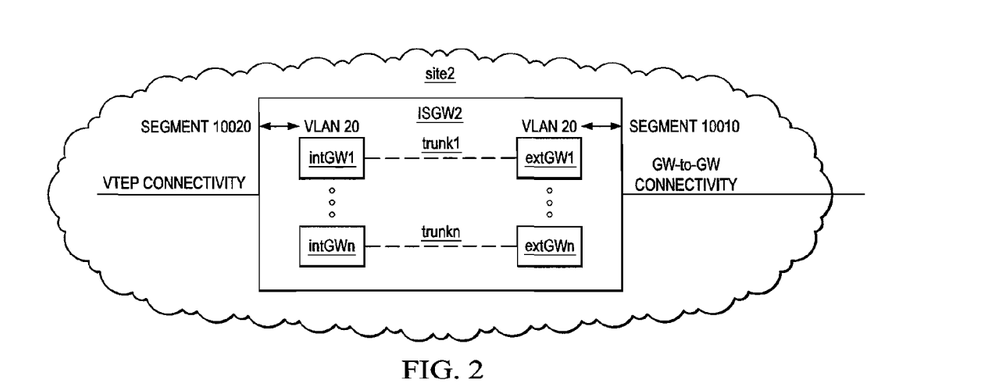
FIG. 2 is block diagram of an inter-site gateway ("ISGW") illustrating use of the ISGW for performing segment mapping through VXLAN gateway pairing in accordance with aspects of one embodiment.

Although the embodiments described hereinbelow are described in the context of a VXLAN gateway used with the Nexus 1000V switch, available from Cisco Systems, Inc., of San Jose, Calif., the techniques described herein are applicable to any other virtual or physical switch. In one embodiment, two types of VXLAN gateways are connected, or paired, through virtual trunk links to facilitate VXLAN extension across multiple sites. This concept is illustrated in FIG. 2 using site site2 as an example. In gateway element ISGW2 of site site2, multiple VXLAN gateway virtual machines are deployed in pairs. They are categorized into two types, internal and external gateways. Internal VXLAN gateways connect to VTEPs within the site and may run control protocols such as BGP or use internal Virtual Supervisor Module (VSM) to Virtual Ethernet Module (VEM) communication mechanism for VTEP and segment discovery within a site or for that matter multicast within that site. In contrast, external VXLAN gateways connect to gateways of other sites. Typically, customers prefer that there not be any control protocols run between these devices across different sites.

FIG. 2 illustrates a more detailed block diagram of one of the sites shown in FIG. 1; in particular site site2. It should be noted that, although site site2 is illustrated for the sake of example, the discussion hereinbelow applies to all of the sites shown in FIG. 1. As shown in FIG. 2, a virtual trunk link may be established between an internal gateway ("intGW") and an external gateway ("extGW"). For example, as shown in FIG. 2, a virtual trunk link designated trunk1 has been established between an internal gateway intGW1 and a corresponding external gateway extGW1. As illustrated in FIG. 2, up to n internal/external gateway pairs may be established within a single ISGW, such as ISGW2. It should be noted that a virtual trunk link should not be established between two internal gateways or two external gateways. This restriction enforces split horizon for traffic going across sites so that loops are avoided. VLANs on a virtual trunk link are used for segment mapping. For example, in FIG. 2, VLAN 20 on the virtual trunk link trunk1 connecting internal gateway intGW1 and external gateway extGW1 is used to carry traffic for a particular VXLAN segment. As previously noted, within site site2, the VXLAN segment belonging to tenant A is allocated VNID 10020 for intra-site connectivity. Therefore, internal gateway intGW1 will map VNID 10020 to VLAN 20, sending and receiving traffic of the segment with VLAN ID 20 over virtual link trunk1. On the other hand, the same VXLAN segment belonging to tenant A is allocated VNID 10100 for inter-site connectivity. Therefore, external gateway extGW1 will map VNID 10100 to VLAN 20, sending and receiving traffic of the segment with VLAN tag 20 over virtual link trunk1. In this way, mapping of different segment IDs can be supported. It is worthwhile to note that the allocation of VLAN 20 to support the segment ID mapping is an internal matter. Customers do not need to configure or even know the mapping between a segment ID and a VLAN. They need only to configure site-local and corresponding inter-site segment ID mapping; allocations of gateways and VLANs over the virtual trunk links are totally transparent to them.

In this manner, each internal gateway of gateway element ISGW2, including intGW1-intGWn, serves as an aggregator for traffic entering site site2, while each external gateway, including extGW1-extGWn, serves as an aggregator for traffic exiting site site2. Each internal gateway intGW1-intGWn communicates with VTEPs within site site2, including VTEPs VTEP3 and VTEP4, using BGP or an internal VSM-to-VEM communication mechanism, for VTEP and segment discovery. Neither external gateways extGW1-extGWn nor VTEPs outside site site2 (e.g., VTEP1, VTEP2, VTEP5, VTEP6) are leaked within site site2. All traffic entering site site2 uses the IP address of one of the internal gateways intGW1-intGWn as its source address. In contrast, each of the external gateways extGW1-extGWn should be provisioned with the IP addresses of the external gateways of other sites; the external gateways extGW1-extGWn are aware of neither internal gateways nor VTEPs inside or outside site site2. All traffic exiting site site2 uses the IP address of one of the external gateways extGW1-extGWn as its source address. In a sense, information within site site2 is hidden from sites site1 and site3 by internal gateways intGW1-intGWn, while information outside site site2 (e.g., sites site1 and site3) is hidden from site site2 by external gateways extGW1-extGWn. In this manner, the internal and external gateways of ISGW2 isolate site site2 from sites site1 and site3. In similar fashion, internal and external gateways of ISGW1 and ISGW3 isolate their respective sites from the remaining sites.

Figure 3:
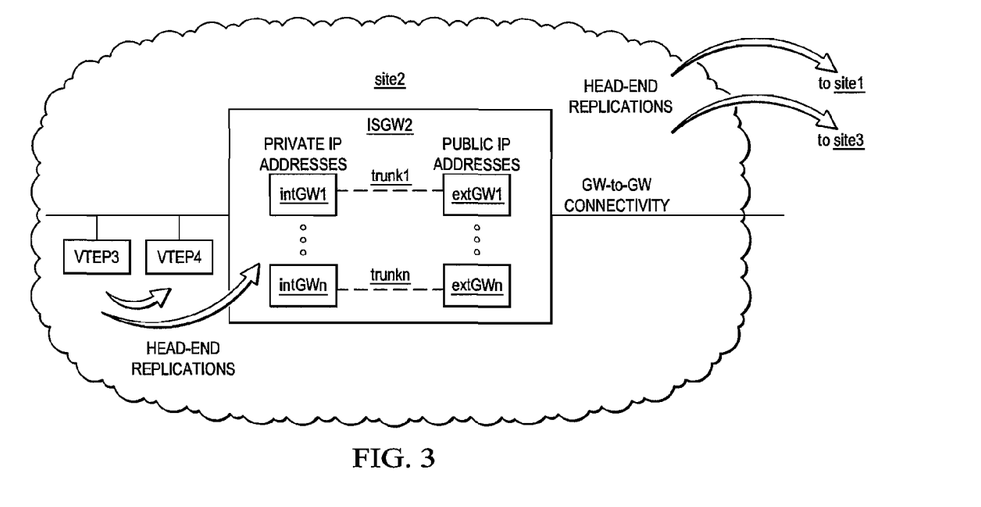
FIG. 3 is another block diagram of an ISGW illustrating use of the ISGW for performing site isolation in accordance with aspects of one embodiment.

The site isolation described above with reference to FIG. 2 achieves a variety of significant benefits, as depicted in and described with reference to FIG. 3. One such benefit is increased scalability. In particular, a VTEP within a site is rendered unaware of VTEPs outside of the site; for inter-site traffic, internal gateway IP addresses are learned. For example, referring to FIG. 1, when VTEP VTEP3 receives a packet originating from VTEP VTEP5, it will learn the address of internal gateway intGW1 instead of the address of VTEP VTEP5. In this manner, each VTEP is prevented from having to learn the addresses of all of the other VTEPs in the system; rather, each VTEP need only learn the IP address of the internal gateways of its own site. Another benefit is increased stability. In particular, because a VTEP does not "learn" VTEPs outside of its own site, the VTEP does not need to relearn the MAC-to-VTEP address binding when a VM moves from one VTEP to another within a site. For example, referring again to FIG. 1, when a VM moves from VTEP VTEP5 to VTEP VTEP6 in site site3, VTEP VTEP3 (in site site2) will continue to receive frames from the VM encapsulated in VXLAN with internal gateway intGW1 as the source IP address; the move causes no change in the MAC-to-VTEP mapping at remote sites (either site site1 or site site2).

Yet another benefit is more efficient head-end replication. Because a VTEP within a site is not aware of VTEPs outside of the site, only one copy of a packet is sent to an internal gateway for traffic exiting the site. Similarly, because an external gateway is aware of external gateways but not VTEPs in other sites, only one copy of a packet is sent to each of other sites. For example, referring to FIG. 3, when VTEP VTEP3 sends a multi-destination packet outside of the site, it needs to send only one copy to internal gateway intGW1 instead of sending four copies, one each to VTEPs VTEP1, VTEP2, VTEP5 and VTEP6. Similarly, external gateway extGW1 needs to send only one copy each to external gateways of sites site1 and site3, respectively, instead of sending four copies, one each to VTEPs VTEP1, VTEP2, VTEP5 and VTEP6. Still another benefit is avoidance of network address translation ("NAT"). Specifically, because internal and external gateways perform VXLAN encapsulation and decapsulation using their own IP addresses, private and public addresses can be assigned to internal and external gateways, respectively, so that NAT can be avoided. For example, referring to FIG. 3, it will be assumed for the sake of example that VTEPs in site site2 (VTEPs VTEP3 and VTEP4) are assigned private IP addresses. A VXLAN packet from VTEP VTEP3 to outside of site site2 will be decapsulated by internal gateway intGW1 and re-encapsulated by external gateway extGW1. If external gateway extGW1 uses a public IP address for encapsulation, other sites (sites site1 and site3) will learn the routable source IP address.

Figure 4:
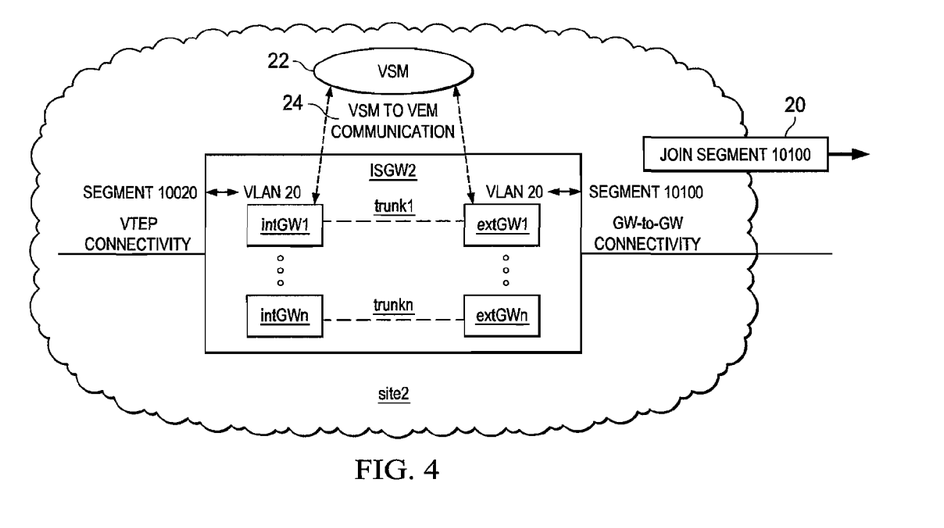
FIG. 4 is another block diagram of an ISGW illustrating use of the ISGW for performing segment pruning using a data path approach in accordance with aspects of one embodiment.

Segment pruning among multiple sites, given the restriction that no control protocol (such as BGP) is permitted between sites, will now be considered and addressed. In one embodiment, a data path based approach is employed for performing segment pruning across sites. In such embodiments, as illustrated in FIG. 4, instead of establishing BGP adjacencies among sites, a special segment pruning VXLAN packet, designated by a reference numeral 20, is used to signal segment interests across sites. The VXLAN packet contains a VNID in the VXLAN header that indicates the segment of interest. The inner destination MAC address of the packet is an IEEE reserved MAC address (for example, 01-80-C2-00-00-0E). The reserved MAC address ensures that the frame encapsulated in the packet will be punted to the CPU of the ISGW instead of being sent over the virtual trunk link once the packet is decapsulated by the receiving external gateway. The payload of the encapsulated frame carries pruning opcodes, which may include, for example, query, join, leave, etc. An external gateway, such as external gateway extGW1, uses a query opcode to solicit reports of segment interests from other sites and join and leave opcodes to report its own segment interests.

A pair of internal and external gateways should exchange segment pruning information. In Nexus 1000V, an internal gateway can pass the segment pruning information within the site, learned through BGP or an internal VSM-to-VEM communication mechanism, to a VSM via an internal VSM-to-VEM communication mechanism. The VSM then distributes the information to the internal gateway's pairing external gateway via internal VSM-to-VEM communication mechanism. Similarly, an external gateway can pass the segment pruning information from outside the site, learned through segment pruning VXLAN packets, such as the packet 20, to the VSM via an internal VSM-to-VEM communication mechanism. The VSM then distributes the information to the external gateway's pairing internal gateway via the internal VSM-to-VEM communication mechanism.

For example, in FIG. 4, internal gateway intGW1 learns through BGP or an internal VSM-to-VEM communication mechanism that there are recipients, i.e., VTEPs VTEP3 and VTEP4, in segment 10020. Internal gateway intGW1 passes segment join information to external gateway extGW1 via a VSM 22 using an internal VSM-to-VEM communication mechanism 24. External gateway extGW1 then generates and sends segment pruning VXLAN packets, such as packet 20, with a join opcode for segment 10020 to other sites (sites site1 and site3). Similarly, when external gateway extGW1 receives a segment pruning VXLAN packet 20 with a join opcode for segment 10100 from another site, it passes segment join information to internal gateway intGW1 using the internal VSM-to-VEM communication mechanism 24 via VSM 22. The internal gateway intGW1 will notify VTEPs VTEP3 and VTEP4 of its interest in segment 10020 via BGP or internal VSM-to-VEM communication mechanism.

Figure 5:
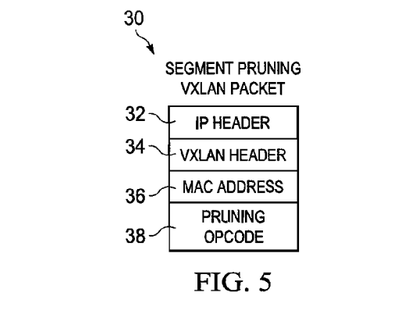
FIG. 5 is a block diagram of a segment pruning VXLAN packet used in connection with performing segment pruning using a data path approach in accordance with aspects of one embodiment.

FIG. 5 is a more detailed illustration of a segment pruning VXLAN packet 30 in accordance with embodiments described herein. As shown in FIG. 5, the packet 30 includes an IP header 32, a VXLAN header 34, a MAC address 36, and a pruning opcode 38.

Figure 6A:
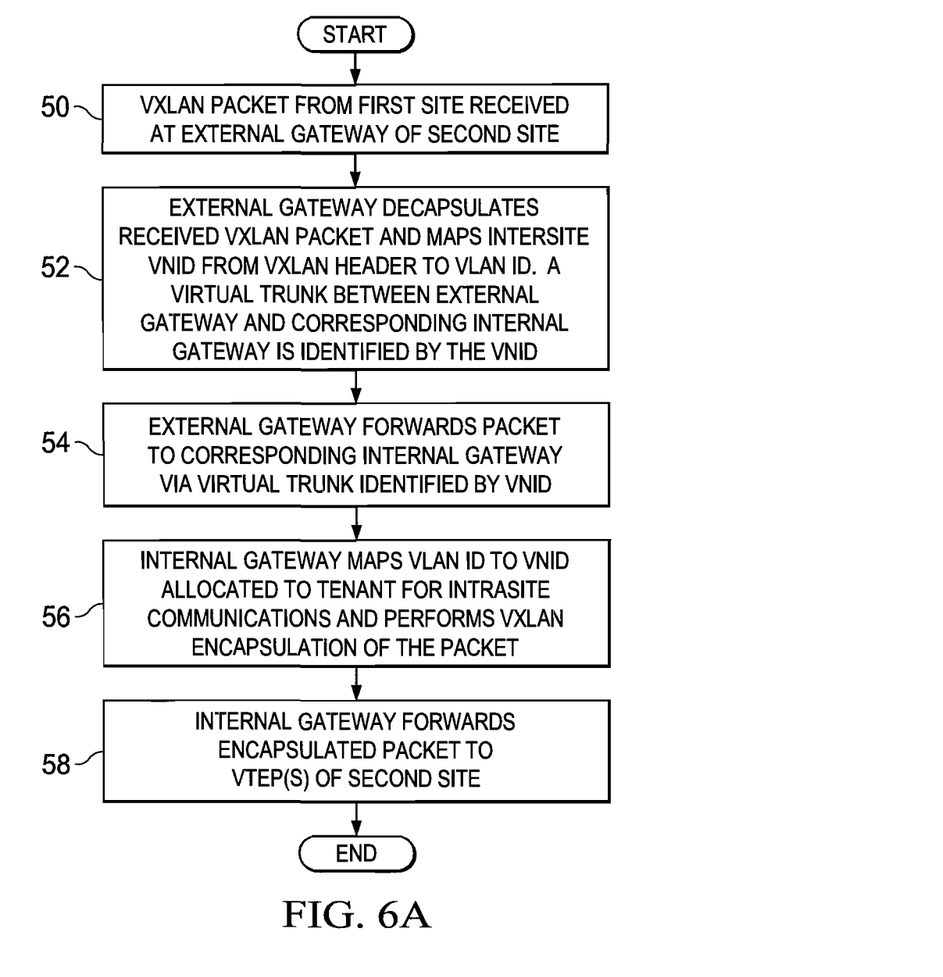
FIGS. 6A and 6B are flowcharts collectively illustrating operation of an exemplary embodiment for extending VXLAN segments across multiple data center sites in accordance with aspects of one embodiment.
Figure 6B:
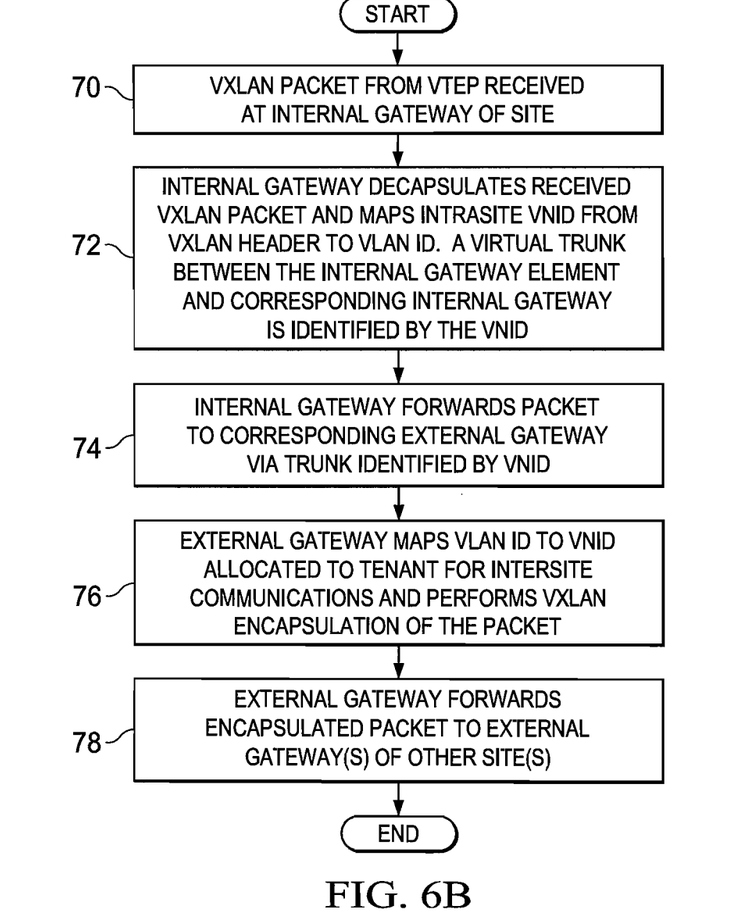

FIGS. 6A and 6B collectively comprise flowcharts illustrating a technique for extending VXLAN segments across multiple sites in accordance with aspects of various embodiments described herein. Referring first to FIG. 6A, execution begins at step 50 when a VXLAN packet originating from an external gateway disposed within an ISGW of a first data center site is received at a destination external gateway disposed within an ISGW of a second data center site. In step 52, the receiving external gateway decapsulates the received VXLAN packet and maps the VNID from the VXLAN header of the packet (which is the VNID allocated to the tenant for inter-site communications) to a VLAN ID. In addition, a virtual trunk between the external gateway and a corresponding internal gateway is identified by the VNID. In step 54, the decapsulated packet is forwarded to the corresponding internal gateway via the virtual trunk identified by the VNID. In step 56, upon receipt of the packet at the corresponding internal gateway, the internal gateway maps the VLAN ID to the VNID allocated to the tenant for intra-site communications and performs VXLAN encapsulation on the packet, including the intra-site VNID in the VXLAN header and using the IP address of the internal gateway as the source address. In step 58, the internal gateway forwards the packet to VTEPs connected to the segment identified by the intrasite VNID.

Referring now to FIG. 6B, execution begins at step 70 when a VXLAN packet originating from a VTEP of a first site is received by an internal gateway element disposed within an ISGW of the first data center site. In step 72, the internal gateway decapsulates the received VXLAN packet and maps the VNID from the VXLAN header of the packet (which is the VNID allocated to the tenant for intra-site communications) to a VLAN ID. In addition, a virtual trunk between the internal gateway element and a corresponding external gateway element is identified by the VNID. In step 74, the decapsulated packet is forwarded to the corresponding external gateway via the virtual trunk identified by the VNID. In step 76, upon receipt of the packet at the corresponding external gateway, the external gateway maps the VLAN ID to the VNID allocated to the tenant for inter-site communications and performs VXLAN encapsulation on the packet, including the inter-site VNID in the VXLAN header and using the IP address of the external gateway as the source address, and forwards the packet to one or more external gateways of other sites in step 78.

Although the above-described embodiments based on VXLAN gateway pairing constitute one example technique for extending VXLAN across multiple sites, other embodiments may be implemented using a single gateway comprising a pair of internal and external VTEPs. Moreover, although the above-described embodiments have been demonstrated in a multi-site environment with different VNID allocations, most of noted benefits are common to both multi-site environments with different VNID allocation and multi-site environments with same VNID allocation. Specifically, even if the data centers of interest are within the same administrative domain, the teachings herein are valuable in that they provide scalable and stable multi-site connectivity, they make across-site multicast-less VXLAN more efficient, and they avoid the need for network address translation. Additionally, they enable segment pruning across multiple sites without requiring a control protocol to be run between the sites.

In summary, the embodiments described herein connect two types of VXLAN gateways through virtual trunk links to facilitate VXLAN extension across multiple sites. The embodiments also achieve scalability, stability, more efficient head-end replication and NAT avoidance by site isolation through VXLAN gateways. Moreover, the disclosed embodiments employ a data path approach for segment pruning. Benefits of the embodiments include, but are not limited to, supporting extension of a VXLAN segment across multiple sites with different VNID allocations; providing a scalable and stable multi-site, also known as hybrid cloud, solution; rendering cross-site multicast-less VXLAN more efficient; avoiding network address translation; and enabling cross-site segment pruning without requiring control protocols to be run between the sites.

In one example implementation, various devices involved in implementing the embodiments described herein can include software for achieving the described functions. For example, referring to FIG. 2, each of the ISGWs, such as the gateway element ISGW2, may be implemented using one or more computer devices comprising software embodied in one or more tangible media for facilitating the activities described herein. The computer device for implementing the ISGW may also include a memory device (or memory element) for storing information to be used in achieving the functions as outlined herein. Additionally, the computer device for implementing the ISGW may include a processor that is capable of executing software or an algorithm to perform the functions as discussed in this Specification, including but not limited to the functions illustrated in and described with reference to FIGS. 6A and 6B. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in FIGS. 6A-6B may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 6A and 6B. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein (e.g., the various VTEPs) can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

It should also be noted that, although the examples provided above are described in the context of VXLAN, the techniques described herein may be implemented in the context of numerous other types of overlay techniques capable of supporting multiple network tenants, including, but not limited to, Network Virtualization using Generic Routing Encapsulation ("NVGRE"), in which case a 24-bit Tenant Network Identifier ("TNI") would be employed in place of the VNID to uniquely identify tenants in the network as described above.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   establishing a virtual trunk link between a first network element and a second network element, wherein the first and second network elements are located at a first site, wherein the first site and a second site comprise at least a portion of an overlay network;
   receiving data traffic at the first network element, wherein the data traffic is associated with a segment of the overlay network;
   mapping a first network identifier allocated to the overlay network segment at the first network element to a virtual trunk link and a VLAN ID;
   forwarding the data traffic from the first network element to the second network element via the virtual trunk link with the VLAN ID; and
   sending a pruning data packet for signaling segment interests for the first site, wherein a payload of the pruning data packet comprises an opcode for performing at least one of querying for segment interests of another site, for joining a segment, and for leaving a segment.

2. The method of claim 1 further comprising:
   mapping the virtual trunk link and the VLAN ID to a second network identifier allocated to the overlay network segment at the second network element; and
   forwarding the data traffic from the second network element via the overlay network segment.

3. The method of claim 2, wherein the first network identifier is allocated to the overlay network segment for one and only one of inter-site communication and intra-site communication and the second network identifier is allocated to the overlay network segment for the remaining one of inter-site communication and intra-site communication.

4. The method of claim 3, wherein the first and second network identifiers are the same.

5. The method of claim 3, wherein the first and second network identifiers are different.

6. The method of claim 1, wherein the virtual trunk link is exclusive to the first network element and the second network element.

7. The method of claim 1, wherein the overlay network is implemented using one of a Virtual eXtensible Local Area Network ("VXLAN") and Network Virtualization using Generic Routing Encapsulation ("NVGRE") and the first network identifier comprises one of a VXLAN Network Identifier ("VNID") and a Tenant Network Identifier ("TNI").

8. One or more non-transitory tangible media that includes code for execution and when executed by a processor is operable to perform operations comprising:
establishing a virtual trunk link between a first network element and a second network element, wherein the first and second network elements are located at a first site, wherein the first site and a second site comprise at least a portion of an overlay network;
receiving data traffic at the first network element, wherein the data traffic is associated with a segment of the overlay network;
mapping a first network identifier allocated to the overlay network segment at the first network element to a virtual trunk link and a VLAN ID;
forwarding the data traffic from the first network element to the second network element via the virtual trunk link with the VLAN ID; and
sending a pruning data packet for signaling segment interests for the first site, wherein a payload of the pruning data packet comprises an opcode for performing at least one of querying for segment interests of another site, for joining a segment, and for leaving a segment.

9. The media of claim 8 further including code for execution and when executed by a processor is operable to perform operations comprising:
mapping the virtual trunk link and the VLAN ID to a second network identifier allocated to the overlay network segment at the second network element; and
forwarding the data traffic from the second network element via the overlay network segment.

10. The media of claim 9, wherein the first network identifier is allocated to the overlay network segment for one and only one of inter-site communication and intra-site communication and the second network identifier is allocated to the overlay network segment for the remaining one of inter-site communication and intra-site communication.

11. The media of claim 8, wherein the virtual trunk link is exclusive to the first network element and the second network element.

12. The media of claim 8, wherein the overlay network is implemented using one of a Virtual eXtensible Local Area Network ("VXLAN") and Network Virtualization using Generic Routing Encapsulation ("NVGRE") and the first network identifier comprises one of a VXLAN Network Identifier ("VNID") and a Tenant Network Identifier ("TNI").

13. An apparatus comprising:
a memory element configured to store data;
a processor operable to execute instructions associated with the data; and
an inter-site gateway element configured to:
establish a virtual trunk link between a first network element and a second network element, wherein the first and second network elements are located at a first site, wherein the first site and a second site comprise at least a portion of an overlay network;
receive data traffic at the first network element, wherein the data traffic is associated with a segment of the overlay network;
map a first network identifier allocated to the overlay network segment at the first network element to a virtual trunk link and a VLAN ID; forward the data traffic from the first network element to the second network element via the virtual trunk link with the VLAN ID; and
send a pruning data packet for signaling segment interests for the first site, wherein a payload of the pruning data packet comprises an opcode for performing at least one of querying for segment interests of another site, for joining a segment, and for leaving a segment.

14. The apparatus of claim 13, wherein the inter-site gateway element is further configured to:
map the virtual trunk link and the VLAN ID to a second network identifier allocated to the overlay network segment at the second network element; and
forward the data traffic from the second network element via the overlay network segment.

15. The apparatus of claim 14, wherein the first network identifier is allocated to the overlay network segment for one and only one of inter-site communication and intra-site communication and the second network identifier is allocated to the overlay network segment for the remaining one of inter-site communication and intra-site communication.

16. The apparatus of claim 13, wherein the virtual trunk link is exclusive to the first network element and the second network element.

17. The apparatus of claim 13, wherein the overlay network is implemented using one of a Virtual eXtensible Local Area Network ("VXLAN") and Network Virtualization using Generic Routing Encapsulation and the first network identifier comprises a VXLAN Network Identifier ("VNID") and a Tenant Network Identifier ("TNI").

* * * * *